United States Patent Office 3,514,516
Patented May 26, 1970

3,514,516
NEMATOCIDAL COMPOSITION AND METHOD CONTAINING DIALKYL AND DIALKENYL N,N'-BIS(SUBSTITUTED CARBAMOYLOXY)DI-THIOLOXALIMIDATES
John C. Summers, Wilmington, Del., assignor to E. I. du Pont de Nemours and Company, Wilmington, Del., a corporation of Delaware
No Drawing. Filed Aug. 18, 1967, Ser. No. 661,510
Int. Cl. A01n 9/20
U.S. Cl. 424—327          9 Claims

ABSTRACT OF THE DISCLOSURE

Chemical compounds of the class dialkyl and dialkenyl N,N'-bis(substituted carbamoyloxy)dithioloxalimidates, such as dimethyl N,N'-bis(methylcarbamoyloxy)dithioloxalimidate, useful in preventing the destructive effects of nematodes.

BACKGROUND AND SUMMARY

This invention relates to chemical compounds useful as nematocides and is more particularly directed to dialkyl and dialkenyl N,N'-bis(substituted carbamoyloxy)dithioloxalimidates of the following formula, and their use as nematocides:

(I)
$$R_3-NH-\overset{O}{\underset{\|}{C}}-O-N\diagdown_{\underset{R_1-S}{C-C}}\diagup^{N-O-\overset{O}{\underset{\|}{C}}-NH-R_4}_{S-R_2}$$

wherein:

$R_1$ and $R_2$, can be the same or different and are alkyl of one through 4 carbon atoms or alkenyl of three through four carbon atoms; and $R_3$ and $R_4$, can be the same or different and are hydrogen, alkyl of one through four carbon atoms, alkenyl of three through four carbon atoms or propargyl.

Compounds of Formula I wherein $R_1$ is the same as $R_2$ and $R_3$ is the same as $R_4$ are preferred because of their economy of manufacture.

While there is an ever growing number of chemical nematocides available to the public there is also a continuing need for nematocides which possess desirable physical properties, desirable nematocidal activity, or desirable nematocidal activity and good tolerance by plants and animals.

In the context of this disclosure the term "nematocide" is employed to designate a compound that kills, inactivates, repels or otherwise prevents the destructive effects of plant parasitic nematodes, at any stage in the life cycle of said nematodes.

In most areas of the world, the solids used for agricultural or horticultural pursuits contain populations of plant parasitic nematodes. Losses due to nematodal infestation range from moderate reductions in yield to complete elimination of the harvest. Therefore, effective and economical methods of preventing crop reduction due to this widespread pest are needed.

The term "nematode," unless otherwise indicated, is intended to refer to and include all life forms, such as eggs, larvae and adults of plant-parasitic members of the phylum Nemata. These are generally unsegmented worms under one-eighth of an inch in length. Most species present in the soil attack the roots or other underground parts of plants. Some species, however, attack the above ground plant parts such as the crown, stem, leaves, buds or seeds.

The parasitic nematodes damage crops and reduce useful produce in a number of ways. Species which attack plants largely from the outside are called "ectoparasites."

Their feeding often results in the death of the rootlets involved. When the numbers of such nematodes are large, many rootlets are killed, resulting in reduced growth and limited yields of the infested crop.

Species which enter and live within root tissue are called "endoparasites."

Both ectoparasitic and endoparasitic nematodes can cause a malformation of the affected plant part and can even cause the death of the tissue surrounding the point of attack. Such effects not only reduce the general vigor of the plant, but, in many cases, actually destroy the market value of the crop. One example of this loss of marketability occurs when carrots affected in this fashion are malformed thereby losing their marketability.

Furthermore, damage caused by plant-parasitic nematodes can serve as entry courts for other plant pathogens such as fungi, bacteria and viruses. Therefore, it is also intended that the compounds of this invention be used in combination with other pesticides, such as fungicides, bacteriocides and virucides.

The most efficient operation of a farm unit often requires that susceptible crops be planted in an area known to contain damaging populations of plant-parasitic nematodes. In the case of established perennial crops, plant-parasitic nematodes may invade established perennial crops such as tree fruit, sugarcane and pineapple.

When nematodal infestation occurs the farm manager can increase fertilizer and water to offset damage to the root system or apply chemicals to control the nematodes. At best, the additional fertilizer and water have proven to be expensive and only partially effective and when the nematode species is one that causes malformation of the produce this procedure is often of no value. Thus, the greatest hope for effective nematode control lies in the use of chemical nematocides.

Many of the chemicals now available for the control of nematodes are phytotoxic and can be safely used only well in advance of the planting of a crop. This need for a time lag between nematocidal application and planting complicates the scheduling of cultural activities and, if weather conditions restrict the planting period, may even prevent the application of the nematocidal chemical.

The compounds of this invention, however, do not damage plants when applied as herein described and, therefore, can be used before, during or even after planting. In many instances, treatment with the compounds of this invention is most efficient if delayed until after the young crop plants have become established.

In addition to phytotoxicity, previously available compounds or compositions and methods for controlling nematodes often are high in cost per unit of area treated; disagreeable to the operator by reason of being malodorous, irritating, or lachrymatory; or have restricted utility. The compounds and methods of this invention, however, are safe to seeds and growing plants at well above the necessary use rates; are easily and safely handled; are able to provide an extended period of protection; and are economical to use due to their effectiveness at low rates. Therefore, the compounds and methods of this invention allow for practical crop protection on a broad scale.

DESCRIPTION OF THE INVENTION

As will be recognized by those skilled in the art, the compounds of Formula I can exist in any or all of three isomeric forms, with the relation of one carbamoyloxy-thiolimidate grouping to the other being syn-syn, syn-anti or anti-anti.

Those compounds of Formula I where $R_1$ is the same as $R_2$ and $R_3$ is the same as $R_4$ are preferred because they are the most economical to manufacture. Of these compounds, dimethyl N,N'-bis(methylcarbamoyloxy)dithioloxalimidate and dimethyl N,N'-bis(ethylcarbamoyloxy)dithioloxalimidate are most preferred because of their outstanding nematocidal activity and safety margin on crops.

Preparation

The compounds of Formula I wherein $R_1$ and $R_2$ are the same and $R_3$ and $R_4$ are the same are prepared by reacting an appropriate mercaptan with dichloroglyoxime in an inert solvent such as an alcohol-water mixture, followed by the addition of sodium hydroxide to give the desired dialkylmercaptoglyoxime. This reaction is illustrated by Equation A:

(A)
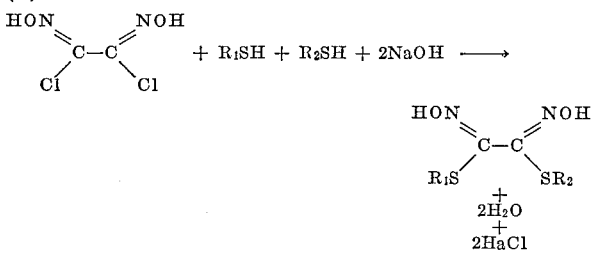

The dialkylmercaptoglyoxime obtained in reaction A is then dissolved or suspended in an inert solvent or diluent such as methylene chloride, cyclohexane, chloroform, carbon tetrachloride, benzene, toluene, xylene and the like. An appropriate isocyanate is then added to this solution or suspension to obtain the desired compound of Formula I. This reaction is illustrated by Equation B:

(B)
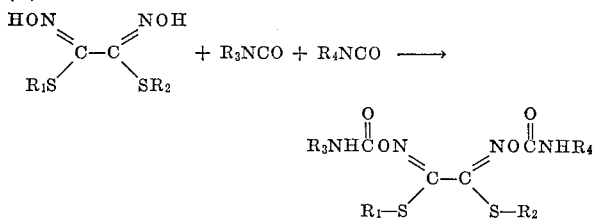

To prepare those compounds of Formula I wherein $R_1$ and $R_2$ are different, reaction A is performed stepwise with the addition of one equivalent of $R_1SH$ and sufficient sodium hydroxide to neutralize the mixture followed by the addition of one equivalent of $R_2SH$ and a second portion of sodium hydroxide.

To prepare those compounds of Formula I wherein $R_3$ and $R_4$ are different, reaction B is performed stepwise with the addition of one equivalent of $R_3NCO$ to the appropriate dialkylmercaptoglyoxime followed by the addition of one equivalent of $R_4NCO$.

The dichloroglyoxime starting material for Equation A is prepared by the chlorination of glyoxime, as illustrated in Equation C:

(C)
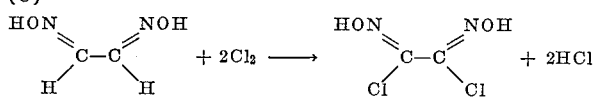

The preparation of dichloroglyoxime by the chlorination of glyoxime is described by Brintzinger and Titzmann Ber. 85, 344(1952).

Nematodes controlled

Representative of the nematodes from which the compounds of Formula I offer protection are the following:

Awl nematode—*Dolichodorus heterocephalus*
Banana nematode—*Pratylenchus musicola*
Bud and leaf nematodes—*Aphelenchoides* spp.
Burrowing nematode—*Radopholus similus*
Carrot root nematode—*Heterodera carotae*
Coffee root-knot nematode—*Meloidogyne exigua*
Corn nematode—*Pratylenchus zeae*
Dagger nematode—*Xiphinema diversicaudatum*
Golden nematode—*Heterodera rostochiensis*
Grass nematode—*Anguina agrostis*
Kidney-shaped nematode—*Rotylenchus reniformis*
Lance nematodes—*Hoplolaimus* spp.
Meadow nematodes—*Pratylenchus* spp.
Northern root-knot nematode—*Meloidogyne hapla*
Pea root nematode—*Heterodera gottingiana*
Peanut root-knot nematode—*Meloidogyne arenaria*
Potato rot nematode—*Ditylenchus destructor*
Rice nematode—*Ditylenchus angustus*
Ring nematodes—*Criconemoides* spp.
Smooth-headed lesion nematode—*Pratylenchus brachyurus*
Southern root-knot nematode—*Meloidogyne incognita*
Soybean cyst nematode—*Heterodera glycines*
Spiral nematodes—*Helicotylenchus* spp.
Stem and bulb nematode—*Ditylenchus dipsaci*
Sting nematodes—*Belonolaimus* spp.
Stubby-root nematodes—*Trichodorus* spp.
Sugar beet nematode—*Heterodera schachtii*
Tobacco cyst nematode—*Heterodera tabacum*
Tobacco stunt nematode—*Tylenchorhynchus claytoni*
Wheat nematode—*Anguina tritici*

Formulations

Compositions of this invention suitable for practical use as nematocides will include one or more compounds of Formula I above either individually, in admixture with each other, or in admixture with other pesticides, and can include surface-active agents, solid or liquid diluents and other materials as described to produce wettable powders, suspensions, emulsifiable concentrates, dusts, solutions, granules, pellets or high-strength compositions.

*Wettable powders.*—The nematocidal compounds of this invention are frequently applied on or in the soil. This can be done by dispersing them in water and spraying this mixture on the soil with or without simultaneous or subsequent tillage to incorporate them into the soil. Similarly the compounds of this invention can be dispersed in volatile oils and applied in the same manner. The compounds of this invention can be conveniently formulated as a wettable powder to efficiently accomplish this result as the solubility of the compounds of this invention in both water and organic solvents is low, but finite. Tank mixtures of wettable powders with oils or water at concentrations suitable for normal use will have all or part of the active material in solution rather than in suspension.

Formulations in the form of wettable powders are physically stable, free flowing compositions comprised of effective amounts of compounds of this invention, surfactants and inert extenders.

The surfactants useful in formulating the compounds of this invention act as wetting, dispersing and emulsifying agents and result in a rapid wetting and dispersion of the powder formulations in either water or organic media. The surfactants can include such anionic, non-ionic and cationic agents as have been used heretofore in pesticidal compositions of similar type. A detailed list of such agents is found in "Detergents and Emulsifiers 1966 Annual" (John W. McCutcheon, Inc.).

Anionic and non-ionic surfactants are preferred in formulating compounds of this invention. Of these the solid surfactants are most preferred because of ease of incorporation and elimination of caking problems that might otherwise occur. However, best dispersion of powders in an organic medium is frequently obtained by use of a liquid non-ionic agent, which normally functions in an oil solution concentrate as an emulsifier.

Of those surfactants that act as wetting agents, the most preferred are alkyl benzene and alkyl naphthalene sulfonates; petroleum sulfonates; sulfated fatty alcohols; amines or acid amides; sulfonated or sulfated fatty acid esters; sulfonated vegetable oils; long-chain esters of sodium isethionate; and esters of sodium sulfosuccinate.

The most preferred non-ionic surfactants for dispersion in organic media are the polyethylene oxide adducts of alkyl phenols, fatty alcohols, sorbitol, sorbitan fatty acid esters and propylene oxide. Additionally, these non-ionic surfactants serve as wetting agents if the composition is used in water instead of an organic media.

Surfactants most preferred for formulating wettable powders for dispersion in water are the sodium, calcium or magnesium salts of lignin sulfonic acids; sodium salts of polymeric alkyl naphthalene sulfonic acid; sodium salts of benzene sulfonic acid; alkyl substituted polyvinylpyrrolidine; sodium N-methyl-N-(long chain acid) taurates; low viscosity methylcellulose; and low viscosity polyvinyl alcohol.

Inert extenders can also act as grinding aids, anticaking agents and promoters of free flowing characteristics, in addition to providing bulk to wettable powders. Some extenders suitable for use in preparing the wettable powder formulations of this invention are clays, diatomaceous silica and synthetic mineral fillers such as wood flour, shell flours or corn cob flour. Preferred extenders are kaolinites, attapulgite clay, synthetic silicas and synthetic calcium or magnesium silicate.

The wettable powder formulations of this invention will contain from about 25 to 90 weight percent active material, from 0.5 to 3 weight percent wetting agent, from 0.25 to 5 weight percent dispersant and from 2 to 74.25 weight percent extender.

*Dusts.*—Formulations in the form of dusts are most readily prepared by diluting an available wettable powder with an inert carrier in blending equipment that will yield a homogeneous product with a concentration of active material of from 1 to 60 weight percent.

Suitable diluents for this purpose are clays, talc, pyrophyllite, ground phosphate rock, sericite or tobacco stem dust. The choice of diluent is usually based upon the cost and availability of the diluent in the area where formulation is carried out, as shipment of diluent or the formulated dust for any distance is usually uneconomic. Most suitable diluents are dense, rapid settling and free flowing. Since talc, sericite, phosphate rock, pyrophyllite and tobacco stem dust possess all of these described characteristics they are preferred over kaolin clay, when such materials are available to the local custom blender.

When economically feasible, the dusts are prepared at the point of manufacture of the nematocide by first micropulverizing the nematocide with a minimum amount of a suitable dust diluent. This concentrate is then blended with the remainder of the diluent. In this way all of the diluent can be kept dense and free from drifting tendency and only a small amount is subjected to finer grinding.

Normally, however, the manufacturer prepares only a high strength dust base using a small amount of dense, free flowing diluent, such as micaceous talc for further dilution at the point of final formulation. Dispersants are omitted but a wetting agent can be added to aid wetting of the dust by moist soil.

*Granules.*—Formulations in the form of granules are physically stable, particulate compositions containing a compound of Formula I which adheres to or is distributed through a basic matrix of a coherent, inert carrier of microscopic particle size. In order to aid leaching of the active ingredient from the granule, a surfactant can be present.

Nematocides that are not gaseous or highly volatile liquids are often most readily applied in the form of granules. Granular formulations of the compounds of Formula I can be made by application of the active material to preformed granules or by the granulation of mixtures of powdered active material and suitable inert extenders and binders.

Suitable preformed granules to which the active material can be applied include granular attapulgite; granular expanded vermiculite; granular pyrophyllite; granular pecan, walnut or other nut shells; and granular corn cob.

Preferred preformed granules are those with a porous, absorbtive structure. These include attapulgite, expanded vermiculite and granules of the organic materials named above. All are suitable for application of active material from a solvent solution. Granular attapulgite is preferred because of its ability to disintegrate when wet. When the active material is to be applied as a powder with a sticking agent, granular expanded vermiculite is preferred.

Granular formulations prepared from preformed granules will contain from about 2 weight percent to about 10 weight percent of active material. They can also contain from about 0.25 weight percent to 10 weight percent wetting agent and from 2 to 10 weight percent of liquid, low volatile sticking agent. This sticking agent is included in the formulation to prevent the segregation of powdered active material from the granular carrier and it can be any liquid having low volatility and low phytotoxicity. Some suitable sticking agents include heavy mineral oil, glycols such as ethylene or propylene glycol, dimethylphthalate, and long chain alcohols such as lauryl alcohol. A separate sticking agent may not be necessary when the wetting agent is a liquid, non-volatile surfactant such as an octyl or nonylphenol polyethylene oxide condensate. Rapidity of release desired will dictate the nature of the sticking agent used. When quick release and rapid solution of the active material by soil moisture is desired, the sticking agent should be a glycol or liquid, water miscible surfactant. Conversely, release of active material can be delayed by using a hydrophobic sticking agent.

The application of active material to preformed granules is often accomplished by dissolving the active material in an inexpensive volatile organic solvent and applying this solution to the granules. As many of the compounds of this invention are only slightly soluble in the inexpensive volatile solvents normally used, only a limited amount of material can be incorporated within the pore structure of the granule. Therefore, an attempt to incorporate high levels of active material leaves the active material on the outside surface of the granule where tumbling or any excessive handling will result in fines that are excessively high in active content and bulk coarse granules low in active content.

Granules formed from powdered mixtures of active material and diluents having the active material distributed uniformly throughout the granule are preferred if the concentration of active material is to be above 10 percent. Furthermore, such granules can also be tailored for precise control of the rate of disintegration and release of the active material and may be the preferred form even with low strength granules.

There are a number of ways in which these homogeneous granules can be prepared. Dry compaction plus dry granulation and screening can be used. Alternatively, the mixtures can be moistened with water or other solvent, then extruded and cut or moist granulated, dried and screened. Granules can also be made by controlled tumbling of powder plus binder as taught in U.S. Pat. No. 3,192,290.

The active content of these granules will range from about 2 weight percent to 50 weight percent. However, granules containing from 5 weight percent to 10 weight percent are preferred for optimum distribution. The inert carrier can be kaolinite, bentonites of sodium and calcium-magnesium types, attapulgite, gypsum, plaster of paris or any combination of such mineral fillers.

The diluents themselves can be binders when moistened and dried, e.g. swelling bentonites and plaster of paris. Alternatively, minor amounts of other binders can be added such as methyl cellulose, gum arabic, polyvinyl alcohol, swollen starch or soluble lignin sulfonates. The choice of kind and amount of binding agent can be used to control the rate of disintegration of the granules in moist soil. Additional control is also afforded by the addition of minor amounts of water soluble inorganic salts, such as sodium sulfate or ammonium sulfate. Water penetration of granules can be aided by the addition of small amounts of wetting agents. Preferred granules can be prepared by dry granulating the pellets described in U.S. Pat. No. 2,992,090 substituting the compounds of this invention as the active material in place of the herbicides of the patent, and then screening to give 30 to 60 mesh granules. Granular formulations can also be prepared according to the methods taught in U.S. Pat. No. 3,056,723 and U.S. Pat. No. 3,168,437 by substituting the compounds of this invention for the pesticides disclosed in these patents and then formulating according to the teachings of these patents.

Compositions of this invention can be used to soil treatment, sprays or dips either alone or in admixture with insecticides, mitcides, fungicides or other nematocides. The following list is illustrative of the other pesticides that may be used in combination with the compounds of this invention:

1,2,3,4,10,10 - hexachloro - 1,4,4a,5,8,8a - hexahydro-1,4-endoexo-5,8-dimethanonaphthalene;
1,2,3,4,5,6-hexachlorocyclohexane;
2,3,4,5,6,7,8,8 - octachloro - 4,7 - methano - 3a,4,7,7a-tetrahydroindane;
1,1,1-trichloro-2,2-bis(p-chlorophenyl)ethane;
1,2,3,4,10,10 - hexachloro - 6,7 - epoxy - 1,4,4a,5,6,7,8,8a-octahydro-1,4-endoexo-5,8-dimethanonaphthalene;
1,2,3,4,10,10 - hexachloro - 6,7 - epoxy - 1,4,4a,5,6,7,8,8a-octahydro-1,4-endoendo-5,6-dimethanonaphthalene;
1(or 3a),4,5,6,7,8,8 - heptachloro - 3a,4,7,7a - tetrahydro-4,7-methanoindene;
1,1,1-trichloro-2,2-bis(p-methoxyphenyl)ethane;
1,1 - dichloro - 2,2 - bis(p - chlorophenyl)ethane; chlorinated camphene having a chlorine content of 67–69%;
2-nitro-1,1-bis(p-chlorophenyl)butane;
1-naphthyl-N-methylcarbamate;
methylcarbamic acid, ester with phenol, 4-(dimethylamine)-3,5-dimethyl;
methylcarbamic acid, ester with 1,3-dithiolan-2-one oxime;
O,O-diethyl-O-[2-isopropyl-4-methylpyrimid-6-yl] thiophosphate;
O,O-dimethyl-1-hydroxy-2,2,2-trichloroethyl phosphonate;
O,O-dimethyl-S-(1,2-dicarbethoxyethyl) dithiophosphate;
O,O-dimethyl-O-p-nitrophenyl thiophosphate;
O,O-diethyl-O-p-nitrophenyl thiophosphate;
O,O-dimethyl-O-(3-chloro-4-nitrophenyl) thiophosphate;
di-2-cyclopentenyl-4-hydroxy-3-methyl-2-cyclopenten-1-one chrysanthemate;
O,O-dimethyl-O-(2,2-dichlorovinyl) phosphate;
mixture containing 53.3% "Bulan," 26.7% "Prolan" and 20.0% related compounds;
O,O-dimethyl-O-(2,4,5-trichlorophenyl) phosphorothioate;
O,O-dimethyl-S-(4-oxo-benzotriazine-3-methyl) phosphoro-dithioate;
bis-(dimethylamino) phosphonous anhydride;
O,O-diethyl-O-(2-keto-4-methyl-7-a'-pyranyl) thiophosphate;
O,O-diethyl (S-ethyl mercaptomethyl) dithiophosphate;
calcium arsenate;
sodium aluminofluoride;
dibasic lead arsenate;
2'-chloroethyl-1-methyl-2-(p-tert-butylphenoxy)ethyl sulfite;
azobenzene;
ethyl 2-hydroxy-2,2-bis(4-chlorophenyl)acetate;
O,O-diethyl-O-(2-(ethylmercapto) ethyl) thiophosphate;
2,4-dinitro-6-sec-butyl phenol;
O-ethyl O-p-nitrophenylbenzenethiophosphonate;
4-chlorophenyl-4-chlorobenzene sulfonate;
p-chlorophenyl-phenyl sulfone;
tetraethyl pyrophosphate;
1,1-bis-(p-chlorophenyl)ethanol;
1,1-bis-(chlorophenyl)2,2,2-trichloroethanol;
p-chlorophenyl-p-chlorobenzyl sulfide;
bis-(p-chlorophenoxy) methane;
3-(1-methyl-2-pyrolidyl) pyridine;
mixed esters of pyrethrolone and cinerolone keto-alcohols and two chysanthemum acids;
cube and derris, both whole root and powdered;
ryanodine;
mixture of alkaloids known as veratrine;
dl-2-allyl-4-hydroxy-3-methyl-2-cyclopenten-1-one esterified with a mixture of cis and trans dl-chrysanthemum monocarboxylic acids;
butoxypolypropylene glycol;
p-dichlorobenzene;
2-butoxy-2'-thiocyanodiethyl ether;
naphthalene;
1,1-dichloro-2,2-bis(p-ethylpenyl)ethane;
p-dimethylaminobenzenediazo sodium sulfonate;
quinone oxyaminobenzooxohydrazone;
tetraalkyl thiuram sulfides such as tetramethyl thiuram monosulfide or disulfide and tetraethyl thiuram monosulfide or disulfide;
metal salts of ethylene bisdithiocarbamic acid, e.g. manganese, zinc, iron and sodium salts;
pentachloronitrobenzene;
dodecylguanidine acetate;
N-trichloromethylthiotetrahydrophthalimide (captan);
phenylmercury acetate;
2,4-dichloro-6-(o-chloroaniline)-s-triazine;
N-methylmercury p-toluenesulfonanilide;
chlorophenolmercury hydroxides;
nitrophenolmercury hydroxides;
ethylmercury acetate;
ethylmercury 2,3-dihydroxypropyl mercaptide;
methylmercury acetate;
methylmercury 2,3-dihydroxypropyl mercaptide;
3,3'-ethylenebis(tetrahydro-4,6-dimethyl-2H-1,3,5-thiadiazine-2-thione);
methylmercury dicyandiamide;
N-ethylmercury-p-toluenesulfonanilide;
1,4-dichloro-2,5-dimethoxy benzene;
metal (e.g. iron, sodium and zinc), ammonium and amine salts of dialkyl dithiocarbamic acids;
tetrachloronitroanisole;
hexachlorobenzene;
hexachlorophene;
methylmercury nitrile;
tetrachloroquinone;
N-trichloromethylthiophthalimide;
1,2-dibromo-3-chloropene;
1,2-dibromo-3-chloropropene;
dichloropropane-dichloropropene mixture;
ethylene dibromide;
chloropicrin;
sodium dimethyl dithiocarbamate;
1,4-dichloro-2,5-dimethoxybenzene; and
2-(carboxyamino)-1-benzimidazolecarboxylic acid, dimethyl ester.

The use of pesticides such as those listed above in combination with the compounds of this invention and employed according to the methods of this invention appears, in many instances, to enhance the plant protectant power of the compositions of this invention. This increase in the degree of plant protection is most often encountered when the pesticide used in combination with a compound of this invention is a fungicide. This is especially noted when both plant-parasitic nematodes and fungi are present at the locus of treatment.

*Application.*—In applying the compounds of Formula I for nematode control, the compound is of course applied in an amount sufficient to exert the desired action. The required amount, however, will be governed by such variables as method of applications, area of application, time of year, temperature, moisture and the like.

The compositions of this invention can be used to control soil inhabiting plant-parasitic nematodes by incorporation in the soil prior to or during the planting of the crop to be protected. Treatment can involve the complete field (broadcast), a strip of pre-determined width centered on the crop row (band), a spot at each individual plant or hill of plants, or the immediate area of the planting furrow (in-the-row). The compositions of this invention can be applied alone or in combination with other soil treatments, such as fertilizers. Use rates for soil incorporation applications are in the range of 0.25 to 100 kilograms of the active material per hectare of surface actually treated. More preferred rates for this type of application are in the range of 1 to 50 kilograms of active material per hectare with rate of 2 to 25 kilograms of active material per hectare being most preferred for reasons of economy.

The compositions of this invention can also be effectively used to control nematodes in the soil by applying them to the surface of the soil and permitting them to be carried by rainfall or irrigation water to the root zone of the plants to be protected. The solubility of the compounds of this invention is such that they move downward slowly with percolating water. The compounds of this invention are not harmful to plants or seeds and, therefore, plants or seeds can be present in the soil at the time of treatment or put into treated soil after treatment. The use rates for this type application are the same as for the soil incorporation procedure outlined above.

Other methods of applying the compounds of this invention to prevent the destructive effects of plant-parasitic nematodes include: (a) spraying above-ground parts such as stems, leaves or buds in which nematodes are already present or where later attack is possible; (b) addition to transplant water; (c) dipping or soaking reproductive parts, such as seeds, cane pieces or bulbs which are already infested or are to be planted in infested soil, in a water suspension, solvent solution or emulsion of the active ingredient; (d) immersing the root system or entire plant of nursery stock or transplants in an aqueous, solvent or emulsion system of the active ingredient of this invention to disinfest the plant and provide residual protection against subsequent nematode invasion. The concentration of active ingredient in such sprays, transplant water or dips is between 5 to 5,000 grams per 100 liters of water or other liquid carrier, and preferably between 10 and 2,500 grams per 100 liters. The most preferred concentrations are between 25 and 1,500 grams per 100 liters of carrier.

A dry dust formulation of the compounds of this invention can be used in place of the liquid system in all of the applications listed above. These dust formulations will contain from 1 to 60 weight percent of active ingredient, and usually from 2 to 30 weight percent of active ingredient. The most preferred rates are in the range of from 3 to 15 weight percent of active ingredient.

An important attribute of the compounds of this invention is that, under some circumstances, they enter the plant roots from the soil and move throughout the root system. This means that even those portions of the root system outside of the treated soil can, in some cases, be protected from nematode damage.

The following illustrative examples are provided in addition to those above to more fully describe this invention. Parts and percentages are by weight unless otherwise noted.

EXAMPLE 1

To a solution of 60 parts dichloroglyoxime dissolved in 800 parts ethyl alcohol and 800 parts water is added, at 0–10° C., 98 parts methyl mercaptan. Then 218 parts 50% sodium hydroxide is added to make the system slightly basic. Recrystallization of the resulting precipitatate from 2B-alcohol gives 100 parts dimethylmercaptoglyoxime, M.P. 120° C. with decomposition.

To 18 parts dimethylmercaptoglyoxime suspended in 200 parts methylene chloride is added 15 parts methyl isocyanate in 50 parts methylene chloride. Filtration after 2 hours gives 23 parts dimethyl N,N'-bis(methylcarbamolyoxy)dithioloxalimidate, M.P. 189–197° C. Two recrystallizations from acetonitrile gives material melting at 194–195.5° C.

EXAMPLES 2–9

The following indicated products can be prepared by the procedure of Example 1 by substituting an equivalent weight of the indicated mercaptan for the methylmercaptan of Example 1 and an equivalent weight of the indicated isocyanate for the methyl isocyanate of Example 1.

| Ex. | Mercaptan | Isocyanate | Product |
|---|---|---|---|
| 2 | Allyl mercaptan | Methyl isocyanate | Diallyl N,N'-bis(methylcarbamoyloxy) dithioloxalimidate |
| 3 | Ethyl mercaptan | Ethyl isocyanate | Diethyl N,N'-bis(ethylcarbamoyloxy) dithioloxalimidate. |
| 4 | Sec-butyl mercaptan | Methyl isocyanate | Di-sec butyl N,N'-bis(methylcarbamoyloxy) dithioloxalimidate. |
| 5 | Methyl mercaptan | Tert-butyl isocyanate | Dimethyl N,N'-bis(tert-butylcarbamoyloxy) dithioloxalimidate. |
| 6 | do | Crotyl isocyanate | Dimethyl N,N'-bis (crotylcarbomoyloxy) dithioloxalimidate. |
| 7 | do | Propargyl isocyanate | Dimethyl N,N'-bis(propargylcarbamoyloxy) dithioloxalimidate. |
| 8 | But-2-enyl mercaptan | Methyl isocyanate | Di(but-2-enyl) N,N'-bis(methylcarbamoyloxy) dithioloxalimidate. |
| 9 | Methyl mercaptan | But-2-enyl isocyanate | Dimethyl N,N'-bis(but-2-enycarbamoyloxy) dithioloxalimidate. |

EXAMPLE 10

To 31.4 parts dichloroglyoxime in 125 parts ethyl alcohol and 125 parts water is added 30 parts ethyl mercaptan at 0° C. Then 32 parts 50% sodium hydroxide is added at 0–10° C. to give 32 parts diethylmercaptoglyoxime which has a M.P. of 80–95° C. after recrystallization from benzene.

Ten parts methyl isocyanate is then added to 15.6 parts diethylmercaptoglyoxime in 150 parts methylene chloride. The solvent is removed after 4 hours to give 18.5 parts diethyl N,N' - bis(methylcarbamoyloxy)dithioloxalimidate, which after recrystallization from toluene-acetonitrile has a M.P. of 164–166° C.

EXAMPLE 11

To 31.4 parts dichloroglyoxime in 125 parts ethyl alcohol and 125 parts water is added 36.4 parts isopropyl mercaptan at 0° C. To this system is added 32 parts 50% sodium hydroxide at 0–10° C. Workup gives 15 parts diisopropylmercaptoglyoxime, which after two recrystallizations from benzene has a M.P. of 132–135° C.

Seven parts methyl isocyanate is then added to 11.8 parts diisopropylmercaptoglyoxime in 150 parts of methylene chloride. The solvent is removed after 4 hours to give 12 parts diisopropyl N,N'-bis(methylcarbamoyloxy) dithioloxalimidate, M.P. 160–162° C. after recrystallization from toluene-acetonitrile.

EXAMPLE 12

To 18 parts dimethylmercaptoglyoxime in 250 parts methylene chloride is added 22 parts allyl isocyanate. Workup after two days gives 25 parts dimethyl N,N'-bis-(allylcarbamoyloxy)dithioloxalimidate, M.P. 144–148° C. after recrystallization from benzene.

EXAMPLE 13

To 18 parts dimethymercaptoglyoxime in 250 parts methylene chloride is added 20 parts ethyl isocyanate. Workup after two days gives 23.3 parts dimethyl N,N'-bis(ethylcarbamoyloxy)dithioloxalimidate, M.P. 182°–184° C. after recrystallization from benzene-acetonitrile.

EXAMPLE 14

To 60 parts glyoxime in 800 parts ethyl alcohol and 800 parts water is added 100 parts chlorine at a temperature of from 0–10° C. The reaction mixture is allowed to stand overnight. Then 33.5 parts methyl mercaptan, at a temperature of from 0–10° C., is slowly added to this reaction mixture followed by the addition of sufficient 50% aqueous sodium hydroxide to raise the pH to 7. Then 50.5 parts of allyl mercaptan is added to the reaction mixture followed by sufficient 50% aqueous sodium hydroxide to neutralize the reaction mixture. The resulting 1-allylmercapto-2-methylmercaptoglyoxime is filtered from the reaction mixture, and can be further purified by recrystallization from benzene.

To 20.6 parts 1-allylmercapto-2-methylmercaptoglyoxime suspended in 200 parts methylene chloride is slowly added 2.9 parts methyl isocyanate. This reaction mixture is allowed to stand for 3–5 hours after which 4.3 parts n-propyl isocyanate is added. The reaction mixture is again allowed to stand for another 3–5 hours after which allyl methyl N-methylcarbamoyloxy)-N'-(n-propylcarbamoyloxy)dithioloxalimidate is recovered by filtration.

EXAMPLES 15–18

The indicated products can be prepared by the procedure of Example 14 by substituting in the order listed an equivalent weight of each indicated mercaptan for methyl mercaptan and allyl mercaptan respectively of Example 14 and an equivalent weight of each indicated isocyanate for methyl isocyanate and n-propyl isocyanate respectively of Example 14.

| Ex. | Mercaptan | Mercaptan | Isocyanate | Isocyanate | Product |
|---|---|---|---|---|---|
| 15 | n-Butyl mercaptan | Methyl mercaptan | Ethyl isocyanate | Methyl isocyanate | Butyl methyl N-(ethylcarbamoyloxy)-N'-(methylcarbamoyloxy)dithioloxalimidate. |
| 16 | Methyl mercaptan | do | Allyl isocyanate | do | Dimethyl N-(allylcarbamoyloxy) N'-(methylcarbamoyloxy) dithioloxalimidate. |
| 17 | But-2-enyl-mercaptan | do | Methyl isocyanate | do | But-2-enyl methyl N,N'-bis-(methylcarbamoyloxy)dithioloxalimidate. |
| 18 | Methyl mercaptan | Isopropyl mercaptan | Allyl isocyanate | Isopropyl isocyanate | Methyl isopropyl N-(allylcarbamoyloxy)-N'-(isopropylcarbamoyloxy)dithioloxalimidate. |

EXAMPLE 19

A wettable powder is prepared by blending 80 parts diethyl N,N'-bis(methylcarbamoyloxy)dithioloxalimidate with 2 parts alkyl naphthalene sulfonic acid, sodium salt, one part partially disulfonated sodium lignin sulfonate and 17 parts synthetic silica. This mixture is then micropulverized until substantially all particles are below 50 microns and then reblended. The resulting powder wets and disperses readily in water.

The wettable powder of Example 19 is dispersed in water in a concentration of 5 kilograms of powder per 100 liters of water. This dispersion is applied to the surface of the soil, broadcast, at a rate sufficient to provide from 2 to 25 kilograms of active ingredient per hectare of land treated. After the dispersion is sprayed onto the surface of the soil, it is mixed in the soil to a depth of 10 to 15 centimeters with a rotovator or other tillage equipment.

Cotton plants grown in soil infested with southern root-knot nematode (*Meloidogyne incognita*) show normal development, free from nematode infection, when the soil is treated as described above. Cotton plants grown in similar but untreated soil show stunting, and reduced yields due to nematode infection.

Wettable powders with equally satisfactory control of nematodes can be prepared by replacing the diethyl N,N'-bis(methylcarbamoyloxy)dithioloxalimidate of the formulation of Example 19 with any of the following compounds of this invention:

dimethyl N,N'-bis(methylcarbamoyloxy)dithioloxalimidate
diisopropyl N,N'-bis(methylcarbamoyloxy)dithioloxalimidate
dimethyl N,N'-bis(ethylcarbamoyloxy)dithioloxalimidate

EXAMPLE 20

The following ingredients are formulated as a wettable powder according to the method of Example 19:

| | Parts |
|---|---|
| Diisopropyl N,N'-bis(methylcarbamoyloxy) dithioloxalimidate | 70 |
| Lauryl alcohol condensate with polyethylene oxide | 3 |
| Oleyl ester of sodium isethionate | 2 |
| Diatomaceous silica | 25 |

The resulting formulation is suitable for dispersion in either oil or water for application to soil.

This wettable powder is dispersed in water at the rate of 7 kilograms of wettable powder per 100 liters of water. The resulting suspension is sprayed at the rate of 400 liters per hectare on test plots within a field in New York known to contain high populations of northern root-knot nematode (*Meloidogyne hapla*). Promptly following this application, the chemical is thoroughly mixed into the soil to a depth of 10 to 15 centimeters with a rotovator. Head lettuce plants set into the treated soil are protected from attack by the nematodes and grow well to produce a good yield of high-quality heads. Head lettuce planted in similar but untreated soil grows poorly and yields few marketable heads due to damage to the root systems by the northern root-knot nematode.

The active component in Example 20 can be replaced by any of the following compounds to give an equally satisfactory formulation:

dimethyl N,N'-bis(methylcarbamoyloxy)dithioloxalimidate
dimethyl N,N'-bis(allylcarbamoyloxy)dithioloxalimidate
dimethyl N,N'-bis(methylacarbamoyloxy)dithioloxalimidate
dimethyl N,N'-bis(ethylcarbamoyloxy)dithioloxalimidate

EXAMPLE 21

A formulation is prepared according to the method of Example 20 but substituting dimethyl N,N'-bis(methylcarbamoyloxy)dithioloxalimidate as the active ingredient in place of the diisopropyl N,N'-bis(methylcarbamoyloxy)dithioloxalimidate of the formulation of Example 20.

This formulation is added to water at the rate of 80 mg. per liter and used as transplant water in the amount of 235 ml. for each tobacco plant being set in a field that is infested with the southern root-knot nematode (*Meloidogyne incognita*) and the smooth-headed lesion nematode (*Pratylenchus brachyurus*). The treated tobacco plants develop an extensive root system essentially free of root-knot, make rapid growth and produce a good yield. The untreated tobacco plants grow slowly and produce little marketable leaf.

EXAMPLE 22

For the simultaneous control of the root-knot nematode (*Meloidogyne incognita*) and soil fungi as represented by Pythium spp. and Rhizoctonia spp., the wettable powder formulation of Example 21 is applied in a spray which also contained 1,4-dichloro-2,5-dimethoxybenzene. For this type of application, 2.4 kilograms active of the composition of this invention and 4.8 kilograms active of 1,4-dichloro-2,5-dimethoxybenzene is added to 100 liters of water. This mixture is applied as a soil spray by application to a 25 centimeter band over the row in which cotton is to be planted. The application rate on the row is 67.5 kilograms of total active (22.5 kilograms of the compound of this invention and 45 kilograms of 1,4-dichloro-2,5-dimethoxybenzene) per hectare of area actually treated. The soil is rotovated immediately thereafter to mix the chemicals thoroughly with the soil in the treated band. Following this, cotton seed is planted in the treated band. The cotton seedlings which develop are protected against root-knot nematode (*Meloiodogyne incognita*) and the fungi Pythium spp. and Rhizoctonia spp. A healthy stand of cotton plants is obtained and at harvest time with a high yield of lint. Where no treatment is applied, the stand is poor, growth is slow and lint yield is reduced.

Even much higher use rates than those given above are employed with complete safety to the cotton plants.

EXAMPLE 23

A formulation is prepared according to the method of Example 20 but substituting N,N'-bis(allylcarbamoyloxy)-dithioloxalimidate as the active ingredient.

The formulation is dispersed in water and sprayed at the rate of 40 kilograms of active ingredient in 100 decaliters of water per hectare of a Zoysia lawn in Florida where the soil is heavily infested with sting nematode (*Belonolaimus longicaudatus*). After spraying, the material is washed into the ground with an irrigation equivalent to about 20,000 decaliters of water per hectare. The grass in the treated area develops a deep root system and makes rapid growth, whereas grass in a similar but untreated area grows slowly and develops only a shallow root system due to attack by the sting nematode.

EXAMPLE 24

A formualtion is prepared according to the method of Example 20 but substituting diethyl N,N'-bis(methylcarbamoyloxy)dithioloxalimidate as the active ingredient.

This formulation is added to water at the rate of 2 grams per liter. Narcissus bulbs infested with the bulb and stem nematode (Ditylenchus dipsaci) are dipped in this diluted preparation for a period of 30 minutes. The suspension is agitated frequently during the period. The treated bulbs planted in field soil grow to produce good yields of both cut flowers and new bulbs. Similarly infected bulbs that are not treated grow poorly giving only small yields of both flowers and bulbs.

EXAMPLE 25

A formulation is prepared according to the method of Example 20 but substituting dimethyl N,N'-bis(ethylcarbamoyloxy)dithioloxalimidate as the active ingredient.

This formulation is added to water at the rate of 10 grams per liter. The roots and lower stem of woody nursery stock known to be infested with the lance nematode (*Hoplolaimus coronatus*) are dipped in this suspension for three minutes in such a way as to keep the suspension agitated. When stock so treated is planted it grows well and is of good appearance. Similar stock which is not treated grows poorly, is of poor appearance and, in many cases, does not survive.

EXAMPLE 26

A wettable powder is prepared by blending 25 parts dimethyl N,N'-bis(methylcarbamoyloxy)dithioloxalimidate, 1 part dioctyl sodium sulfosuccinate, 2 parts partially disulfonated sodium lignin sulfonate and 72 parts attapulgite clay. This mixture is then micropulverized until substantially all particles are below 50 microns.

This wettable powder is added to water and sprayed on selected plots in a strawberry field known to be heavily infested with the bud and leaf nematode, *Aphelenchoides besseyi*. The spray solution contains 300 grams active of the composition of this invention per 100 liters of water. The rate of application is such as to provide 3 kilograms of the active ingredient per hectare of plot area. All aboveground parts are thoroughly wetted. The strawberry plants in the sprayed plots grow well and give a good yield. In the unsprayed portions of the field, on the other hand, the plants are yellow, grow slowly and produce a poor yield.

EXAMPLE 27

A suitable dust concentrate is prepared by blending 80 parts dimethyl N,N'-bis(allylcarbamoyloxy)dithioloxalimidate with 20 parts micaceous talc. This mixture is then micropulverized until substantlally all particles are less than 100 mesh. This dust concentrate can be diluted to desired strength by a custom formulator using micaceous talc or other diluents for field application as a dust.

This dust concentrate is prepared for field application by the addition of sufficient micaceous talc to provide a final dust containing 5% of the active ingredient. The resulting 5% dust is dusted into alternate open furrows, with seed pieces in place, in a sugarcane field in Florida. The dust is applied at a rate to provide 0.5 kilogram of the active ingredient per 1,000 linear meters of furrow. The dust stream is directed to cover the sides of the furrow as well as the bottom. The furrows are then closed. Ten weeks after planting the treated rows contain full stands of thrifty and well-developed cane. The cane in the untreated rows, on the other hand, is stunted with an unthrifty yellow appearance due to root damage caused by nematodes such as the lance nematodes, Hoplolaimus spp., spiral nematodes, Helicotylenchus spp., and stunt nematodes, tylenchorhynchus spp.

EXAMPLE 28

A dry mix is prepared comprising 5% dimethyl N,N'-bis(methylcarbamoyloxy)dithioloxalimidate and the remainder gypsum and ammonium sulfate. These ingredients are mixed in a cement mixer and while mixing continues water is sprayed on until balling of the mixture occurs. The balled mix is dried, crushed and screened to separate granules having a particle size of from 20 to 60 mesh. These granules are readily disintegrated in water and provide rapid release of the active ingredient.

These rapid release granules are applied at the rate of 40 kilograms of active ingredient per hectare to plots in a field using a conventional fertilizer spreader. The material is then worked into the soil by discing. Tobacco plants grown in soil infested with the lesion nematode, *pratylenchus brachyurus* and the southern rootknot *Meloidogyne incognita* grow and yield well substantially free from nematode infection, when the soil is treated as described above. Tobacco plants grown on untreated plots in the same field grow slowly and produce little marketable leaf.

EXAMPLE 29

Five parts dimethyl N,N'-bis(allylcarbomoyloxy)-dithioloxalimidate is dissolved in boiling alcohol. This solution is sprayed on 95 parts corncob granules, 30 to 60 mesh, in a rotating drum after which the alcohol is evaporated.

This granular formulation is applied evenly at a rate of 20 kilograms of active ingredient per hectare to plots within a field known to be infested with the sugar beet nematode, *Heterodera schachtii*. This application is worked into the soil to a depth of 10 to 15 centimeters. Sugar beets subsequently grown in the treated plots delevop normally and are substantially free from infestation by nematodes. Beets grown in untreated plots in the same field are distorted and produce reduced yields.

EXAMPLE 30

A mixture of 5 parts dimethyl N,N'-bis(ethylcarbamyloxy)dithioloxalimidate and 1.25 parts synthetic fine silica is micropulverized and then micronized. This powder is blended briefly with 83.75 parts 20 to 40 mesh vermiculite in a rotating drum. Then 10 parts ethylene glycol is sprayed upon the vermicculite active mitxure to prevent separation of powder from verimculite. Mineral oil, nonylphenoxy polyethylene oxide or other flowable liquid with very low volatility can be used as the sticking agent.

The granular formulation prepared above is applied at the rate of 0.25 kilograms of active ingredient per 1,000 linear meters of row in the open furrow at the same time that celery plants are set in a field known to be infested with the awl nematode, *Dolichodorus heterocephalus*. Only alternate rows are treated with the above prepared formulation: The celery plants in the treated rows grow rapidly and yield well. The entire root systems of the plants in the treated rows are free from nematode injury even through treatment was limited to the furrow area. The protection of those roots growing outside the soil actually treated is ascribed to the systemic movement of the active ingredient of this invention within the celery roots. The celery plants in the untreated alternate rows are severely stunted due to attack by the awl nematode.

It is to be understood that the foregoing examples are given for purposes of illustration only and other compounds of this invention can be substituted for the active materials used above.

I claim:

1. A nematocidal composition consisting essentially of an inert diluent and a nematocidally effective amount of a compound of the formula $$R_3NH-\overset{O}{\underset{\|}{C}}-O-N=\underset{\underset{R_1-S}{/}}{\overset{}{C}}-\underset{\underset{S-R_2}{\backslash}}{\overset{}{C}}=N-O-\overset{O}{\underset{\|}{C}}-NHR_4$$

wherein:

$R_1$ and $R_2$, can be the same and different, and are selected from the group consisting of alkyl of one through four carbons and alkenyl of three through four carbons; and $R_3$ and $R_4$, can be the same and different and are selected from the group consisting of hydrogen, alkyl of one through four carbons, alkenyl of three through four carbons and propargyl.

2. A nematocidal composition consisting essentially of an inert diluent and a nematocicdally effective amount of a compound of claim 5 wherein $R_1$ and $R_2$ are the same and are selected from the group consisting of alkyl of one through four carbons and alkenyl of three through fur carbons; and $R_3$ and $R_4$, are the same and are selected from the groups consisting of hydrogen, alkyl of one through four carbons, alkenyl of three through four carbons and propargyl.

3. A nematocidal composition consisting essentially of an inert diluent and a nematocidally effective amount of dimethyl N,N-bis(methylcarbamoyloxy)dithioloxyalimidate.

4. A nematocidal composition consisting essentially of an inert diluent and a nematocidally effective amount of dimethyl N,N' - bis(ethylcarbamyloxy) dithioloxalimidate.

5. A method of controlling nematodes comprising applying to the area of nematodal infestation a nematocidally effective amount of a compound of the formula:

$$R_3NH-\overset{O}{\underset{\|}{C}}-O-N=\underset{\underset{R_1-S}{/}}{\overset{}{C}}-\underset{\underset{S-R_2}{\backslash}}{\overset{}{C}}=N-O-\overset{O}{\underset{\|}{C}}-NH-R_4$$

wherein:

$R_1$ and $R_2$, can be the same and different, and are selected from the group consisting of alkyl of one through four carbons and alkenyl of three through four carbons; and $R_3$ and $R_4$, can be the same and different, and are selected from the group consisting of hydrogen, alkyl of one through four carbons, alkenyl of three through four carbons and propargyl.

6. The method of claim 5 wherein the nematocidally effective compound is a compound of the formula $$R_3NH-\overset{O}{\underset{\|}{C}}-O-N=\underset{\underset{R_1-S}{/}}{\overset{}{C}}-\underset{\underset{S-R_2}{\backslash}}{\overset{}{C}}=N-O-\overset{O}{\underset{\|}{C}}-NHR_4$$

wherein:

$R_1$ and $R_2$ are the same and are selected from the group consisting of alkyl of one through four carbons and alkenyl of three through four carbons; and $R_3$ and $R_4$ are the same and are selected from the group consisting of hydrogen, alkyl of one through four carbons, alkenyl of three through four carbons and propargyl.

7. The method of claim 5 wherein the compound being applied is dimethyl N,N'-bis(methylcarbamoyloxy)-dithioloxalimidate.

8. A method for protecting reproductive plant parts from nematodal infestation comprising coating said part with a nematocidally effective amount of dimethyl N,N'-bis(methylcarbamoyloxy)dithioloxalimidate prior to the planting of said seeds.

9. The method of claim 8 wherein the nematocidally effective compound is dimethyl N,N'-bis(ethylcarbamoyloxy)dithioloxalimidate.

References Cited

UNITED STATES PATENTS 3,337,396  8/1967  Spurr _____ 424—327
3,385,691  5/1968  Strycker _____ 71—77 XR ALBERT T. MEYERS, Primary Examiner D. R. ORE, Assistant Examiner U.S. Cl. X.R.

71—77; 260—566; 424—23, 357